United States Patent [19]

Bonga

[11] 4,161,641

[45] Jul. 17, 1979

[54] EDM PROCESS AND APPARATUS FOR OVERCUT MACHINING OF A WORKPIECE BY AN ELECTRODE TOOL

[75] Inventor: Benno Bonga, Crans, Switzerland

[73] Assignee: Ateliers des Charmilles, S.A., Geneva, Switzerland

[21] Appl. No.: 859,219

[22] Filed: Dec. 9, 1977

[30] Foreign Application Priority Data

Dec. 14, 1976 [CH] Switzerland .................. 15688/76

[51] Int. Cl.² .................................................. B23K 9/16
[52] U.S. Cl. ................................ 219/69 M; 219/69 V; 409/184
[58] Field of Search ............... 219/69 M, 69 V, 69 G, 219/69 R, 69 W; 90/15 A, 15 B

[56] References Cited

U.S. PATENT DOCUMENTS

| | | | |
|---|---|---|---|
| 3,919,516 | 11/1975 | Allmann et al. | 219/69 V |
| 4,041,268 | 8/1977 | Braubeau et al. | 219/69 V |
| 4,104,501 | 8/1978 | Wyss | 219/69 V |

*Primary Examiner*—Bruce A. Reynolds
*Attorney, Agent, or Firm*—Hauke and Patalidis

[57] ABSTRACT

An EDM process and apparatus capable of transversely displacing the electrode tool relative to the electrode workpiece according to a translation motion, while simultaneously linearly advancing the electrode tool relative to the electrode workpiece along a longitudinal axis. The process and apparatus of the invention consist in monitoring a machining dimension and comparing it to a predetermined parameter, and, as soon as such predetermined dimension parameter is achieved, sequentially retracting the electrode tool and re-establishing the feed of the electrode tool, while changing the radial direction of electrode translation motion between the beginning of the electrode tool retraction and the end of the electrode tool feed.

30 Claims, 5 Drawing Figures

EDM PROCESS AND APPARATUS FOR OVERCUT MACHINING OF A WORKPIECE BY AN ELECTRODE TOOL

BACKGROUND OF THE PRESENT INVENTION

The present invention relates to a process and apparatus for machining an electrode workpiece by electrical discharges occurring in a machining gap between the electrode workpiece and an electrode tool, the electrode workpiece and the electrode tool being relatively displaced along an axis of feed of the electrode tool into the workpiece and simultaneously along a translation path in a direction perpendicular to the feed axis, the translation motion being controlled from the moment at which machining starts such as to maintain a predetermined machining gap between the electrode workpiece and the electrode tool.

It is known to displace the electrode tool of an EDM machine along a translation motion path relative to the electrode workpiece for the purpose of effecting an even multi-directional enlargement of the electrode tool, using the same electrode tool for rough and finish cuts of the workpiece, while improving the machining fluid flow through the machining gap. However, when the translation, or orbiting, motion is along a circular path, sharp angles of the active surface of the electrode tool cannot be reproduced on the workpiece except with a curvature equal to the radius of the circular motion. If the workpiece must be provided with sharp angles it has been found desirable to effectuate sequentially a series of radial translations of constant amplitudes starting from a central position and in directions uniformly distributed angularly over a complete circle. Such a process, which is disclosed in French Pat. No. 1,274,953, presents the inconvenience, however, of preventing a simultaneous control of the axial and radial progression of machining, and of preventing maintaining an average current of high intensity in view of the regular and synchronous progression of the radial direction of the translation motion.

Another process permitting radial machining, disclosed in U.S. Pat. No. 4,104,501 assigned to the same assignee as the present application, consists in causing the electrode tool to effectuate a series of slanted translations in predetermined directions, relative to the axis of penetration of the electrode tool into the workpiece, such as to control simultaneously the radial and axial machining feed in each of those directions. However, this method, as well as the above-mentioned method, causes the apparition of ineffective time intervals during which machining current is cut-off, resulting in substantially decreasing the intensity of the average machining current.

SUMMARY

The principal object of the present invention is to improve on such prior art methods and apparatus while decreasing the duration of the time intervals during which no cutting takes place. The novel process of the invention is particularly arranged for providing monitoring and detection of the moment at which a predetermined machining dimension is reached and for effectuating, at such instant, a retraction of the electrode tool followed by an advance or feed of the electrode tool, and for controllably varying, through means known per se, the radial direction of the translation motion between the beginning of the electrode tool retraction step and the end of the electrode tool feed step.

Consequently, the angular displacement of the radial direction of the translation motion is controlled in an asynchronous mode as a function of the axial progression of machining in each direction. If each retraction of the electrode tool is accomplished during a very short time interval, the non-machining periods of time are decreased to minimal values in each direction for which the predetermined machining dimension has already been obtained.

BRIEF DESCRIPTION OF THE DRAWING

The present invention will be best understood by those skilled in the art when the following description of the best modes contemplated for practicing the invention is read in conjunction with the accompanying drawing showing, in a schematic manner and for illustrative purpose only, an apparatus for practicing the present invention, and modifications thereof. In the accompanying drawing.

DETAILED DESCRIPTION OF THE PREFERRED EMBODIMENTS

Figure 1:
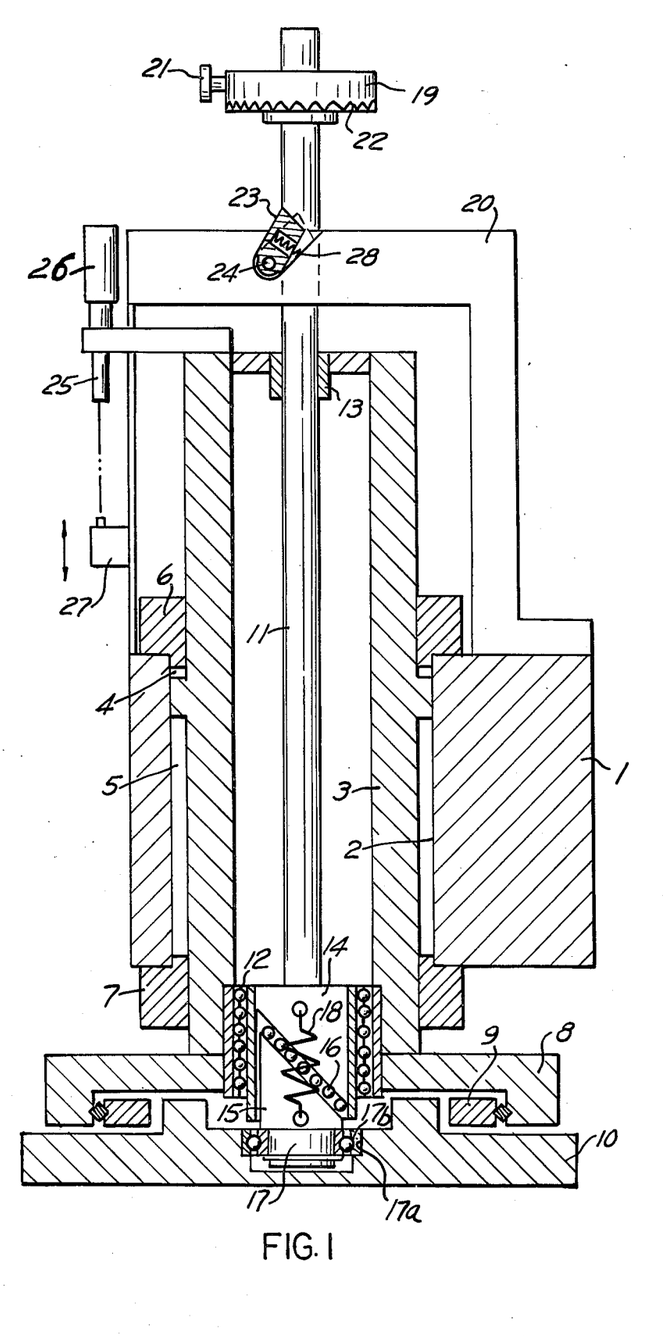
FIG. 1 is a sectional view of an apparatus for laterally displacing an electrode tool relative to an electrode workpiece, according to the present invention.

Referring to the drawing, and more particularly to FIG. 1, there is illustrated, in section, the hydraulic servo-motor of an EDM machine which incorporates an arrangement for displacing the electrode tool and the electrode workpiece of an EDM machine relative to each other in a radial translation motion. The servo-motor comprises a stationary housing 1 provided with a bore 2 forming a cylinder in which reciprocates a piston 3 displaced by a fluid under pressure controllably introduced in a chamber 4 or in a chamber 5 formed, respectively, between the wall of the cylinder bore 2, the piston 3, and the cylinder end caps 6 and 7, as is well known in the art. The conduits and passageways for allowing the pressurized fluid to flow into and from the chambers 4 and 5 are not shown. The instantaneous position and the displacement of the piston 3 is controlled, as is well known in the EDM art, such as to maintain a predetermined gap in the machining zone between the electrode tool and the electrode workpiece.

A plate 8 is mounted at the lower end of piston 3. The plate 8 slidably supports a slide 9 for displacement in a direction perpendicular to the plane of FIG. 1. A tool holder 10, supporting the electrode tool not shown, is linearly slidable relative to the slide 9 in a direction parallel to the plane of FIG. 2, the linear bearings supporting the tool holder 10 from the slide 9 not being shown in the drawing. In this manner, the tool holder 10 is axially displaced by the piston 3 and is laterally, or radially, displaceable relative to the piston 3.

The piston 3 is tubular and supports concentrically a rotatable shaft 11 which is further capable of longitudinal displacement relative to the piston 3. The shaft 11 is supported within the piston 3 by means of a bearing 13 and is provided at its lower end with a cylindrical enlarged member 14 rotatably and linearly supported at the lower end of the piston 3 by ball bearings 12. A reduced diameter eccentric member 15, which is slidable in a direction at an angle to the axis of the shaft 11, for example at an angle of 45°, is mounted at the bottom of the cylindrical member 14, a linear ball bearing 16 being disposed between the angled complementary surfaces of the eccentric member 15 and of the cylindrical member 14. The eccentric member 15 is provided at its lower end with a stub shaft 17 journalled in a corresponding bore 17a in the electrode tool holder 10 by way of a ball bearing 17b. The angled surfaces of the eccentric member 15 and of the cylindrical member 14 are urged towards each other by a spring 18. A similar arrangement is disclosed in detail in the aforesaid U.S. Pat. No. 4,104,501.

The upper portion of the shaft 11 passes through an appropriate bore formed in a bracket 20 affixed to the stationary housing 1. A wheel 19 is adjustably mounted proximate the end of the shaft 11 by means of a set screw 21. The lower face of the wheel 19 is provided with a series of evenly spaced teeth 22.

When the piston 3 is displaced in unison with the shaft 11, the electrode tool holder 10 is also displaced and in the same direction. If the piston 3 is displaced downwardly, the wheel 19 eventually engages the bracket 20, thus preventing the shaft 11 from being further displaced downwardly. When the shaft 11 is prevented from being further displaced longitudinally downwardly, this causes the eccentric member 15 to be laterally or radially, displaced, in turn laterally displacing the electrode tool holder 10, with the result that the electrode tool holder 10 is simultaneously displaced longitudinally and laterally along a resulting path slanted or at an angle in the radial direction determined by the angular position, about its axis of rotation, of the cylindrical member 14 on the end of the shaft 11. The angular position of the cylindrical member 14 around its longitudinal axis is determined by the angular position of the shaft 11 about its axis of rotation.

The wheel 19, mounted proximate the end of the shaft 11, does not engage directly the bracket 20, but the teeth 22 of the wheel 19 engage a ratchet 23 pivotally supported by the bracket 20 by means of a pin 24. Rotation of the ratchet 23 around the axis of the pin 24 causes the wheel 19, and consequently the shaft 11, to be rotated a predetermined angular increment. The depth of the teeth 22 in relation to the length of the actuating end of the ratchet 23 is such that, as soon as the shaft 11 has been rotated a predetermined angular increment, the axial displacement of the shaft 11 is stopped as a result of the wheel 19 engaging the bracket 20, and the tool holder 10 is caused to be laterally translated in a new radial direction.

As soon as the axial feed of the electrode tool into the workpiece reaches a predetermined amount, the end of a rod 25, whose longitudinal position is adjustably set by means of a micrometric screw 26, and which is carried by the piston 3 engages a microswitch 27 which provides an electric signal commanding the EDM machine servo-motor to return the piston 3 upwardly to a position disengaging the ratchet 23 from the teeth 22 on the bottom face of the wheel 19, the ratchet 23 being swung back to its initial position under the biasing action of a spring 28.

At the end of every downstroke of the piston 3, the shaft 11 is thus incrementally angularly rotated when the teeth 22 of the wheel 19 engage the ratchet 23. In this manner, an automatic control of the variation of the radial direction of the translation motion is achieved, the frequency of the incremental variations being a function of the machining speed. A similar control system can evidently be applied to an arrangement providing lateral, or radial, translation motions, rather than slanted paths.

Figure 2:
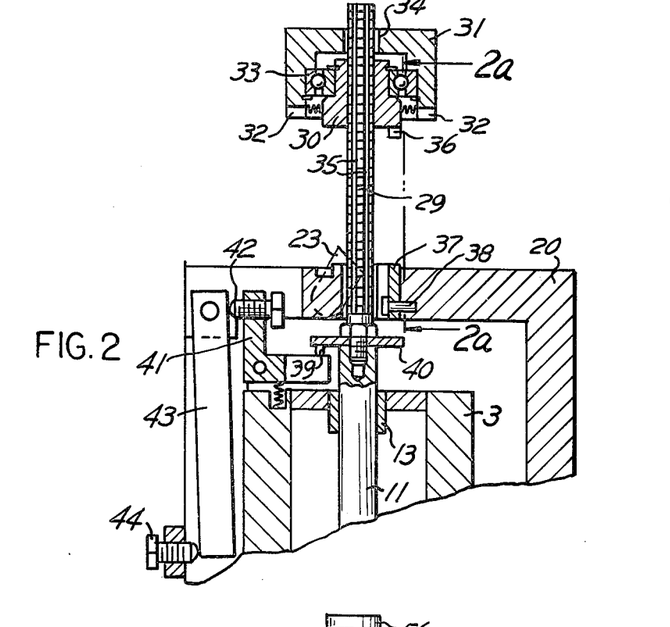
FIG. 2 is a partial view similar to FIG. 1 but showing a modification thereof.
Figure 2A:
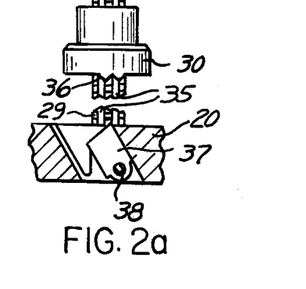
FIG. 2a is a partial section from line 2a—2a of FIG. 2.

FIGS. 2 and 2a illustrate the upper portion of a structure whose lower portion is identical to that shown at FIG. 1. A threaded rod 29, on which thread a nut 30, is mounted on the upper end of the shaft 11, whose axial position and whose angular position relative to the piston 3 determine respectively the length of the translation motion of the electrode tool and the radial direction of such a motion.

A wheel 31, provided with teeth 32 on its lower face, is carried by the nut 30 by way of a ball bearing 33. The wheel 31 is substantially cup-shaped and is fastened to the threaded rod 29 by means of a spline coupling in the form of a grooved bore provided with integral tongues 34 slidably fitting longitudinal peripheral grooves 35 on the threaded rod 29. In this manner, the rotation of the wheel 31, when its teeth 32 engage the ratchet 23, rotates the rod 29 and the shaft 11, as previously described relative to the structure of FIG. 1.

The nut 30 is provided on its lower face with a tooth 36 arranged to engage a second ratchet 37 at a given position during the downward stroke of the shaft 11 and of the threaded grooved rod 29. This in turn causes pivoting of the ratchet 37 about its axis pin 38 and rotates the nut 30, as also shown schematically at FIG. 2a. In view of the fact that the nut 30 threads on the threaded rod 29, the incremental rotation of the nut 30 causes axial displacement of the position of the wheel 31 relative to the rod 29, and consequently also causes displacement of the position of the rod for which its axial displacement is limited by abutment of the wheel 31 with the bracket 20.

Thus, the angular direction of the translation motion is, in addition, displaced to such slanted direction after each cycle of angular displacement of the radial direction of the motion.

As soon as the rod 29 and the shaft 11 are prevented from being displaced axially in unison with the piston 3, the eccentricity of the translation motion is increased until it reaches the value for which a micro-switch 39 supported by the piston 3 becomes disengaged from a plate 40 mounted on the end of the shaft 11 below the rod 35. An electrical signal provided by the microswitch 39 controls the momentary retraction of the electrode tool holder, in the course of which a change of the radial direction of translation is effected, as previously described. In this manner, the feed of the electrode tool within the workpiece is effected by successive slanted translations in predetermined radial directions until a limit of eccentricity is arrived at as determined by the position of the micro-switch 39. The relative position of the micro-switch 39 can be made adjustably variable in the course of the feed of the electrode tool within the workpiece by mounting the microswitch 39 on the end of a pivotable lever 41, having on its other end an adjustable set screw 42 engaging the surface of an inclined cam 43 whose angle of inclination is adjustable by means of a set screw 44. The angle of inclination of the cam 43 corresponds to the draft angle which is desired to be obtained on the machined surface of the workpiece.

Figure 3:
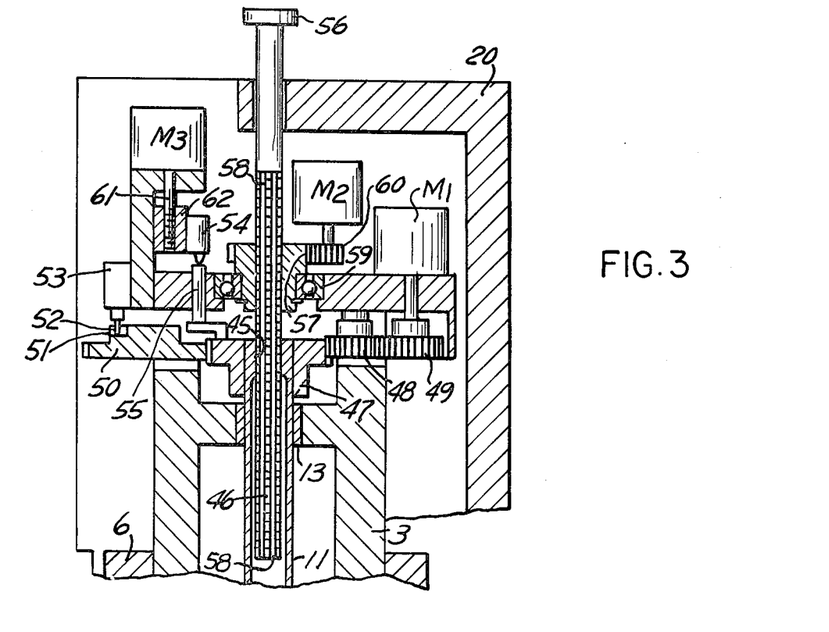
FIG. 3 is a partial view similar to FIG. 1 but showing a further modification thereof.

FIG. 3 illustrates a partial sectional view of the upper portion of a further modification of an apparatus whose lower portion is identical to that illustrated at FIG. 1. The operation of the apparatus illustrated at FIG. 3 is substantially the same as that of the apparatus of FIG. 2, with the exception that in the structure of FIG. 3 the control of the angular displacements and of the adjustment of the abutments are made by means of servo-motors controlled by the electrical circuit schematically shown at FIG. 4, and that such control is capable of being programmed in advance.

As shown in FIG. 3, the shaft 11, which controls the eccentricity and direction of the translation motion, is hollow and is provided with a threaded internal bore portion 45 in which is threadably engaged an externally threaded rod 46. A toothed wheel 47 fastened on the end of the shaft 11 is driven by a servo-motor $M_1$ through a driving unit consisting of gears 48 and 49. The toothed wheel 47 drives a second toothed wheel 50, which is removable, and which is provided on its upper face with a predetermined number of slots 51 into which the plunger 52 of a micro-switch 53 can be engaged. The angular position of the slots 51 around the perimeter of the wheel 50 corresponds to the radial direction in which it is desired to effectuate the translation motion of the electrode tool holder.

Each time the plunger 52 drops in one of the slots 51, the micro-switch 53 provides a signal which stops the motor $M_1$. The motor $M_1$ is started by another signal supplied by a micro-switch 54 actuated by a plunger 55 which follows the longitudinal displacement of the shaft 11 and of the toothed wheel 47 and which, therefore, indicates the instant at which the limit value of the eccentricity is reached.

In such manner, by means of the signals provided by the two micro-switches, a very simple program control of the changes in translation radial direction is effected, the program being determined according to the configuration of the workpiece to be machined.

The arrangement of FIG. 3 comprises, similarly to the arrangement of FIG. 2, means permitting to modify the radial position of the shaft 11 to cause the shaft to no longer follow the displacement of the piston 3. Such position is that for which an abutment 56 supported by the rod 46 engages the upper face of the bracket 20. The angular position of the rod 46 relative to the shaft 11 is adjusted by means of a toothed wheel 57 provided with a splined internal bore having tongues engaged in longitudinal slots 58 disposed around the periphery of the threaded rod 46. The toothed wheel 57, supported by a ball bearing 59, is driven by a servo-motor $M_2$ through a pinion 60. When the servo-motor $M_1$ is stopped, the rotation of the toothed wheel 57, when driven by the motor $M_2$, rotates the rod 46 which is caused to be displaced axially relative to the shaft 11 in view of the interreaction of the peripheral thread of the rod 46 with the internal thread of the threaded portion 45 in the shaft 11. However, when both servo-motors $M_1$ and $M_2$ rotate at the same speed respectively, the shaft 11 and the rod 46 are no longer displaced relative to each other. The structure further comprises a third servo-motor $M_3$ coupled to a jack screw 61 which drives a sliding support member 62 on which the micro-switch 54 is mounted.

Figure 4:
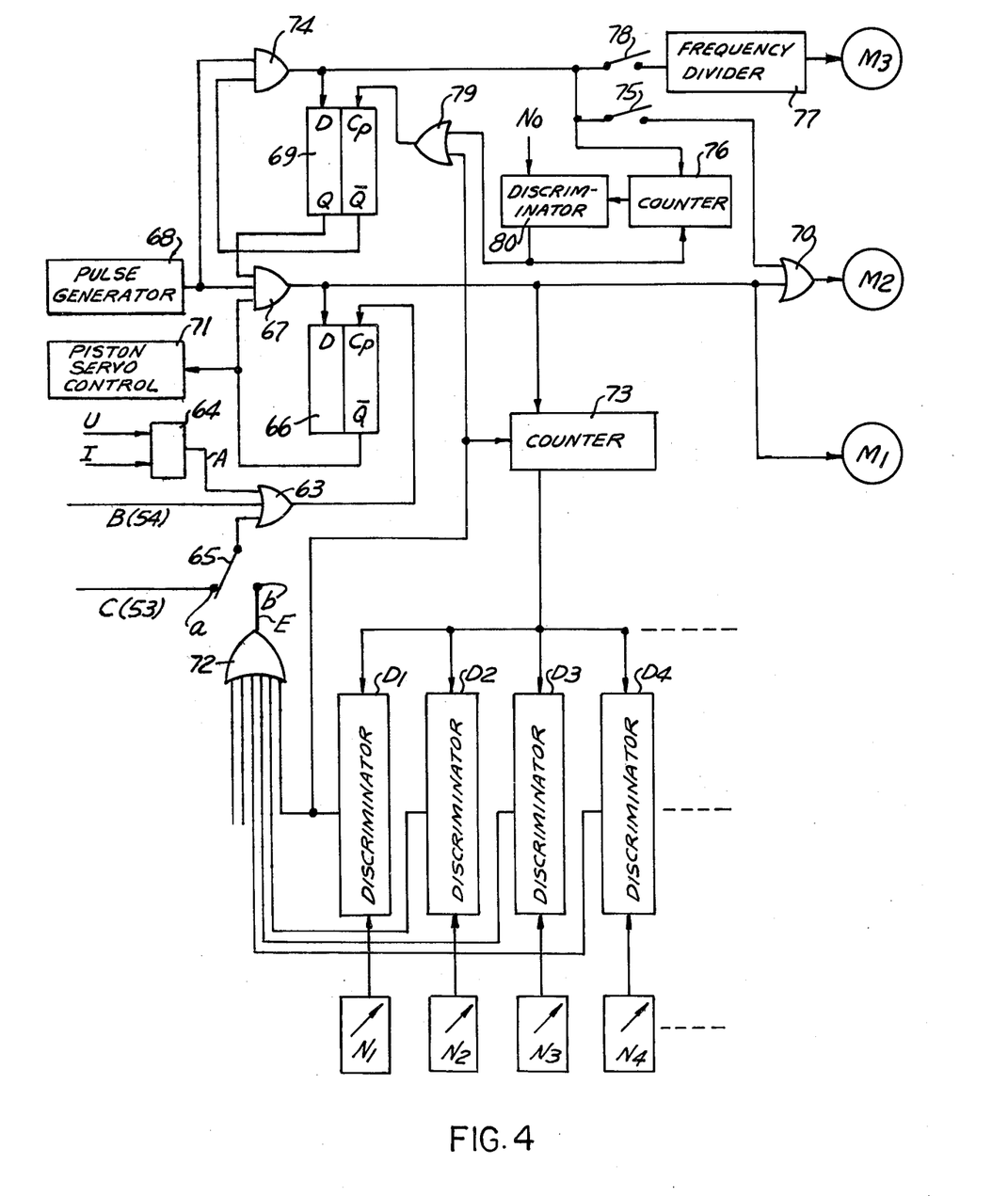
FIG. 4 is an electrical schematic of the control system for operating the structure of FIG. 3.

FIG. 4 is a functional electrical schematic of the means for controlling the servo-motors $M_1$, $M_2$ and $M_3$ of the apparatus illustrated at FIG. 3. An OR gate 63 receives on a first input a signal A indicative of the occurrence of abnormal machining conditions, such a signal being developed by a known monitoring circuit 64 accepting signals representative respectively of the EDM machining current I and voltage U, as is well known in EDM technology. To a second input of the OR gate 63 is applied a signal B, which is the signal supplied by the micro-switch 54 of FIG. 3, which indicates that the amount of eccentricity of the translation motion has reached a predetermined limit value. The third input of the OR gate 63 receives a signal C or a signal E according to the position of a double pole switch 65. The signal C, obtained from the micro-switch 53 of FIG. 3, indicates that the radial direction of the translation motion has reached a desired angular position. The output signal of the OR gate 63 is applied to the input $C_p$ of a flip-flop 66 having an output $\bar{Q}$ which is connected to one of the inputs of an AND gate 67, the other two inputs of the AND gate 67 being connected respectively to the output of a constant frequency pulse generator 68 and to the output Q of another flip-flop 69. The output of the AND gate 67 is connected to both an input D of the flip-flop 66, and to the stepping servo-motor $M_1$ and to the stepping servo-motor $M_2$ through an OR gate 70.

During machining, the control pulses to the two servo-motors $M_1$ and $M_2$ supplied by the pulse generator 68 are blocked by the absence of a signal at the output $\bar{Q}$ of the flip-flop 66, which inhibits the AND gate 67. When the desired machining dimension is reached or, in the alternative, if an abnormal machining condition is detected, either the signal A or the signal B through the OR gate 63 resets the flip-flop 66, such that a signal appears at its output $\bar{Q}$ which activates the servo-control 71 for the piston 3, FIG. 3, for displacing the piston in the direction that retracts the electrode tool from the workpiece while simultaneously enabling the AND gate 67 such as to permit the passage of pulses from the pulse generator 68 to the stepping motors $M_1$ and $M_2$, resulting in a change of the radial direction of the translation motion. As soon as the desired angular position of the shaft 11 is reached, with the switch 65 on the position a, the signal C at the output of the micro-switch 53 set the flip-flop 66, back to its initial state, causing the absence of signal at the output $\bar{Q}$ at the flip-flop to inhibit the AND gate 67 and stop the operation of the stepping motors $M_1$ and $M_2$.

A more precise control of the stepping motors $M_1$ and $M_2$ is obtained by means of a signal E substituted for the signal C. When the switch 65 is on the position b, the signal E is supplied at the output of an OR gate 72 having a plurality of inputs each one of which is connected to the output of one of the numerical discriminators D1 through D4. Each numerical discriminator compares a digital reference number stored in each of the registers N1 through N4 with a number obtained at the output of a pulse counter 73 whose input accepts the command pulses supplied to the motors $M_1$ and $M_2$ from the pulse generator 68 through the AND gate 67.

The stored numbers N1 through N4 correspond each to a given rotation of the shaft 11, FIG. 3, and are each chosen as a function of the workpiece desired configuration such that the sum of the numbers correspond to a 360° rotation of the shaft 11. After each cycle of rotation of the shaft 11, the signal appearing at the output of the discriminator D1 resets the counter 73 back to 0. In this manner, angular displacements of the radial direction of the relative motion between the electrode tool and the workpiece are obtained, such displacements being programmed and controlled with a very high precision.

The control of the servo-motor $M_3$ of FIG. 3 is obtained through an AND gate 74, FIG. 4, having an input receiving pulses from the pulse generator 68 and another input connected to the output $\bar{Q}$ of the flip-flop 69. The output of the AND gate 74 is connected to both the input D of the flip-flop 69 and to one of the input of the AND gate 70 when a switch 75 is closed, and to a counter 76 and to the motor $M_3$ through a frequency divider 77 when a switch 78 is closed. The input $C_p$ of the flip-flop 69 is connected to the output of an OR gate 79 having an input receiving a signal from the discriminator D1 and another input receiving a signal from a further discriminator 80. The latter provides at its output a pulse each time the number of pulses applied to the counter 76 reaches a predetermined number $N_o$.

As long as there is no signal at the output $\bar{Q}$ of the flip-flop 69, the control pulses for the motor $M_3$ are blocked at the AND gate 74. At each cycle of displacement of the shaft 11 by way of the motor $M_1$, the signal at the output of the discriminator D1 resets the flip-flop 69, and a signal appearing at the output Q of the flip-flop inhibits the AND gate 67 such as to prevent pulses from reaching the motor $M_1$, while simultaneously, the signal appearing at the output $\bar{Q}$ of the flip-flop enables the AND gate 74, such that pulses are fed to either the motor $M_2$ or the motor $M_3$, or both, according to whether or not the switches 75 and 78 are selectively closed or opened.

As soon as the number of the pulses reaches the predetermined number $N_o$, the discriminator 80 provides a signal at its output which resets the flip-flop 69 and controls the motors to a stop as a result of a signal appearing at the output $\bar{Q}$ of the flip-flop. The number of pulses supplied to the motor $M_2$ corresponds to the displacement of the abutment 56, FIG. 3, relative to the shaft 11, while the number of pulses supplied to the motor $M_3$ corresponds to the displacement of the microswitch 54, that is to the displacement of the maximum eccentricity of translation motion. The ratio between the pulses applied to the motor $M_2$ and to the motor $M_3$ determines the draft angle of the lateral surfaces of a cavity or of the workpiece itself.

It is also contemplated to control the operation of the flip-flop 69 at each change in the translation direction by means of the signal appearing at the output $\bar{Q}$ of the flip-flop 66.

In arrangement wherein the angular displacements of the translation motion are programmed by the microswitch 53, the motor $M_1$ can be replaced by a conventional type DC or AC electric motor.

I claim:

1. In a process for EDM machining an electrode workpiece by means of an electrode tool wherein said electrodes are displaced one relative to another from an initial relative position simultaneously along an axis of penetration of the electrode tool within the electrode workpiece and in a direction perpendicular to said axis, such relative displacement being controlled from the start of a machining operation such as to maintain a predetermined machining gap between the electrode tool and the electrode workpiece, the improvement comprising monitoring the moment at which a predetermined machining dimension is achieved, retracting the electrode tool at such moment, following said retraction by a further advance of said electrode tool, and progressively changing the radial direction of translation motion between the beginning of said retraction and the end of said advance.

2. The process of claim 1 wherein said retraction followed by said advance and said change of direction is effected as soon as abnormal machining conditions are detected in the machining zone between said electrodes.

3. The process of claim 1 wherein the value of the angular displacement of said radial direction is varied in the course of a cycle of displacement of said direction.

4. The process of claim 1 wherein said initial relative position of said electrodes is changed after at least one cycle of angular displacement of the radial direction of said translation motion.

5. The process of claim 1 wherein said machining dimension is changed after at least one cycle of angular displacement of the radial direction of said translation motion.

6. The method of claim 1 wherein said initial relative position of said electrodes and said machining dimension are changed after at least one cycle of angular displacement of the radial direction of said translation motion.

7. An apparatus for EDM machining an electrode workpiece of an electrode tool wherein said electrodes are displaced one relative to the other from an initial relative position simultaneously along a direction of an axis of penetration of the electrode tool within the workpiece and in a direction perpendicular to said axis, such relative displacement being controlled from the start of a machining operation such as to maintain a predetermined machining gap between the electrode tool and the electrode workpiece, said apparatus comprising means for effecting said relative displacement of said electrodes from said initial position along a translation motion at an angle in a predetermined direction, at least one servo-motor for controlling said displacement, means for developing an electrical signal as soon as the actual penetration of said electrode tool in said workpiece reaches a predetermined value, means cooperating with said servo-motor and controlled by said signal for withdrawing and subsequently advancing said electrode tool within said workpiece, and means for effecting a predetermined angular displacement in the radial direction of the translation motion during both withdrawal and advance of said electrode tool.

8. The apparatus of claim 7 further comprising means for developing a second electrical signal representing abnormal machining condition, said second signal actuating said means cooperating with said servo-motor.

9. The apparatus of claim 7 further comprising means storing consecutive values of said angular displacement, means for maintaining said angular displacement, and means for stopping said angular displacement when predetermined values are obtained.

10. The apparatus of claim 7 comprising support means for one of said electrodes, said support means being axially displaced by said servo-motor, means for displacing said support means in a radial translation motion relative to the other said electrode, a rotatable shaft cooperating with an eccentric such as to vary the eccentricity of said translation motion and said radial direction of said motion respectively as a function of said axial displacement and of said angular position relative to said support means, and means for rotating said shaft a predetermined angle around its axis simultaneously with axially displacing said shaft relative to said support means.

11. The apparatus of claim 10 wherein said shaft has an adjustable abutment for stopping said axial displacement and a toothed wheel rotated by a ratchet cooperating with said abutment for rotating said shaft a predetermined angle.

12. The apparatus of claim 7 further comprising means for varying said machining dimension after at least one complete cycle of angular displacement of said shaft.

13. The apparatus of claim 7 further comprising means for varying said initial position after at least one complete cycle of angular displacement of said shaft.

14. The apparatus of claim 7 further comprising means for varying said machining dimension and said initial position at least after one complete cycle of angular displacement of said shaft.

15. An apparatus for EDM machining an electrode workpiece by an electrode tool wherein said electrodes are displaced one relative to the other from an initial relative position simultaneously along a direction of an axis of penetration of the electrode tool within the workpiece and in a direction perpendicular to said axis, such relative displacement being controlled from the start of a machining operation such as to maintain a predetermined machining gap between the electrode tool and the electrode workpiece, said apparatus comprising means for effecting said relative displacement of said electrodes from said initial position along a translation motion at an angle in a predetermined direction, at least one servo-motor for controlling said displacement, means for developing an electrical signal as soon as the eccentricity of said translation motion reaches a predetermined value, means cooperating with said servo-motor and controlled by said signal for withdrawing and subsequently advancing said electrode tool within said workpiece, and means for effecting a predetermined angular displacement in the radial direction of the translation motion during both withdrawal and advance of said electrode tool.

16. The apparatus of claim 15 further comprising means for developing a second electrical signal representing abnormal machining condition, said second signal actuating said means cooperating with said servo-motor.

17. The apparatus of claim 15 further comprising means storing consecutive values of said angular displacement, means for maintaining said angular displacement, and means for stopping said angular displacement when predetermined values are obtained.

18. The apparatus of claim 15 comprising support means for one of said electrodes, said support means being axially displaced by said servo-motor, means for displacing said support means in a radial translation motion relative to the other said electrodes, a rotatable shaft cooperating with an eccentric such as to vary the eccentricity of said translation motion and said radial direction of said motion respectively as a function of said axial displacement and of said angular position relative to said support means, and means for rotating said shaft a predetermined angle around its axis simultaneously with axially displacing said shaft relative to said support means.

19. The apparatus of claim 18 wherein said shaft has an adjustable abutment for stopping said axial displacement and a toothed wheel rotated by a ratchet cooperating with said abutment for rotating said shaft a predetermined angle.

20. The apparatus of claim 15 further comprising means for varying said machining dimension after at least one complete cycle of angular displacement of said shaft.

21. The apparatus of claim 15 further comprising means for varying said initial position after at least one complete cycle of angular displacement of said shaft.

22. The apparatus of claim 15 further comprising means for varying said machining dimension and said initial position at least one complete cycle of angular displacement of said shaft.

23. An apparatus for EDM machining an electrode workpiece of an electrode tool wherein said electrodes are displaced one relative to the other from an initial relative position simultaneously along a direction of an axis of penetration of the electrode tool within the workpiece and in a direction perpendicular to said axis, such relative displacement being controlled from the start of a machining operation such as to maintain a predetermined machining gap between the electrode tool and the electrode workpiece, said apparatus comprising means for effecting said relative displacement of said electrodes from said initial position along a translation motion at an angle in a predetermined direction, at least one servo-motor for controlling said displacement, means for developing an electrical signal as soon as the actual penetration of said electrode tool in said workpiece and the eccentricity of said translation motion reach predetermined values, means cooperating with said servo-motor and controlled by said signal for withdrawing and subsequently advancing said electrode tool within said workpiece, and means for effecting a predetermined angular displacement in the radial direction of the translation motion during both withdrawal and advance of said electrode tool.

24. The apparatus of claim 23 further comprising means for developing a second electrical signal representing abnormal machining condition, said second signal actuating said means cooperating with said servo-motor.

25. The apparatus of claim 23 further comprising means storing consecutive values of said angular displacement, means for maintaining said angular displacement, and means for stopping said angular displacement when predetermined values are obtained.

26. The apparatus of claim 23 comprising support means for one of said electrodes, said support means being axially displaced by said servo-motor, means for displacing said support means in a radial translation motion relative to the other said electrode, a rotatable shaft cooperating with an eccentric such as to vary the eccentricity of said translation motion and said radial direction of said motion respectively as a function of said axial displacement and of said angular position relative to said support means, and means for rotating said shaft a predetermined angle around its axis simultaneously with axially displacing said shaft relative to said support means.

27. The apparatus of claim 26 wherein said shaft has an adjustable abutment for stopping said axial displacement and a toothed wheel rotated by a ratchet cooperating with said abutment for rotating said shaft a predetermined angle.

28. The apparatus of claim 23 further comprising means for varying said machining dimension after at least one complete cycle of angular displacement of said shaft.

29. The apparatus of claim 23 further comprising means for varying said initial position after at least one complete cycle of angular displacement of said shaft.

30. The apparatus of claim 23 further comprising means for varying said machining dimension and said initial position after at least one complete cycle of angular displacement of said shaft.

* * * * *

UNITED STATES PATENT AND TRADEMARK OFFICE
CERTIFICATE OF CORRECTION

PATENT NO. : 4,161,641
DATED : July 17, 1979
INVENTOR(S) : Benno Bonga

It is certified that error appears in the above-identified patent and that said Letters Patent are hereby corrected as shown below:

Column 6, line 52, change "b" to --$\underline{b}$--.

Signed and Sealed this

Twenty-second Day of April 1980

[SEAL]

Attest:

SIDNEY A. DIAMOND

Attesting Officer      Commissioner of Patents and Trademarks